(12) United States Patent
Fischer et al.

(10) Patent No.: US 6,349,004 B1
(45) Date of Patent: Feb. 19, 2002

(54) HEAD MOUNTED DISPLAY VIEWING OPTICS WITH IMPROVED OPTICAL PERFORMANCE

(75) Inventors: Robert E. Fischer, Westlake Village; Michael P. Newell, Thousand Oaks, both of CA (US)

(73) Assignee: Optics 1, Inc., Westlake Village, CA (US)

( * ) Notice: Subject to any disclaimer, the term of this patent is extended or adjusted under 35 U.S.C. 154(b) by 0 days.

(21) Appl. No.: 09/616,130

(22) Filed: Jul. 13, 2000

Related U.S. Application Data

(60) Provisional application No. 60/144,035, filed on Jul. 16, 1999.

(51) Int. Cl.[7] .............................. G02B 13/18; G02B 3/02
(52) U.S. Cl. ........................ 359/708; 359/569; 359/643; 359/802
(58) Field of Search ................. 359/708, 716–718, 359/741–742, 802, 643–647, 13–16, 19–20, 558, 566, 569

(56) References Cited

U.S. PATENT DOCUMENTS

| | | | |
|---|---|---|---|
| 3,390,935 A | 7/1968 | Scidmore | 359/644 |
| 3,612,662 A | 10/1971 | Sissel | 359/643 |
| 4,099,842 A | 7/1978 | Kaneko | 359/644 |
| 4,482,217 A | 11/1984 | Nagler | 359/646 |
| 4,525,035 A | 6/1985 | Nagler | 359/644 |
| 5,148,314 A | 9/1992 | Chen | 359/642 |
| 5,557,463 A | 9/1996 | Ueno | 359/646 |
| 5,790,312 A | 8/1998 | Togino | 359/631 |

*Primary Examiner*—Jordan M. Schwartz
(74) *Attorney, Agent, or Firm*—Akin, Gump, Strauss, Hauer & Feld, LLP

(57) ABSTRACT

A lens design form is used for a viewing optical system or magnifier that includes a cemented doublet and a weak aspheric element, for example, made of acrylic, and having a diffractive kinoform surface superimposed on the surface profile of the aspheric element. The design significantly reduces both chromatic aberrations and minimizes most of the monochromatic aberrations of the optical system or magnifier. By allowing the lens design form to produce an image on a curved surface, optical performance is improved further over the prior art systems because this allows the elements in the system to control the image blurring aberrations rather than having to also control field curvature. The human eye can accommodate for the curved field, and thus the curved field does not reduce image quality, but instead allows image quality to be enhanced. The viewing optical system also can be used for image projection.

21 Claims, 7 Drawing Sheets

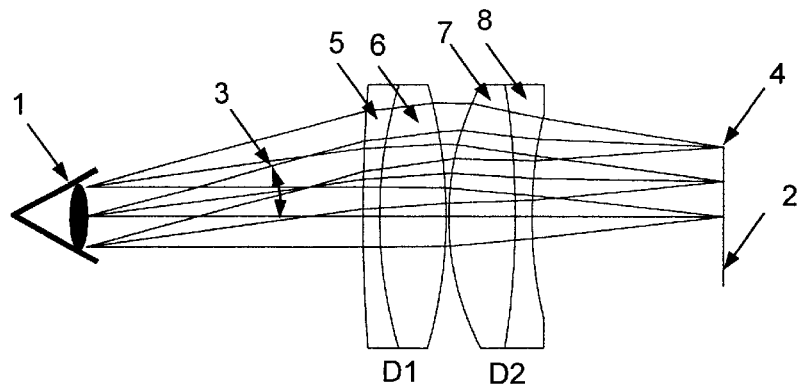

Fig. 1 (Prior Art)

```
GENERAL LENS DATA:
Surfaces                :            9
Stop                    :            1
System Aperture         : Entrance Pupil Diameter = 5
Glass Catalogs          : schottv misc Ohara_v OHARA
Effective Focal Length  :     24.12986
Back Focal Length       :     17.46709
Total Track             :     57.54171
Image Space F/#         :      4.825971
Stop Radius             :      2.5
Paraxial Image Height   :      6
Entrance Pupil Diameter :      5
Exit Pupil Diameter     :     54.05008
Exit Pupil Position     :    261.0195
Field Type              : Paraxial Image height in Millimeters
Maximum Field           :      6
Primary Wave            :      0.5875618
Lens Units              : Millimeters
Angular Magnification   :     -0.09250679

Wavelengths    : 3
Units: Microns
 #         Value         Weight
 1        0.486133       0.300000
 2        0.587562       1.000000
 3        0.656273       0.500000

SURFACE DATA SUMMARY:

Surf    Type         Radius       Thickness      Glass        Diameter
OBJ     STANDARD     Infinity     Infinity       0            0
STO     STANDARD     Infinity     25             0            0
3       STANDARD     138.3955     1.5            SF6          22
4       STANDARD     35.72702     6              S-LAH66      22
•       STANDARD     -37.13341    0.25                        22
•       STANDARD     22.2729      6              S-LAH66      22
•       STANDARD     -64.98186    1.5            SF6          22
8       STANDARD     33.97734     17.29171                    17
IMA     STANDARD     Infinity                                 11.49353
```

Fig. 2 (Prior Art)

```
GENERAL LENS DATA:
Surfaces                      :                   10
Stop                          :                    1
System Aperture               : Entrance Pupil Diameter = 5
Glass Catalogs                : Schott OLD_OHAR OHARA MISC
Effective Focal Length        :         24.02604 (in air)
Back Focal Length             :          0.04368994
Total Track                   :            56.3109
Image Space F/#               :           4.805209
Image Space NA                :           0.103495
Stop Radius                   :                2.5
Paraxial Image Height         :                  6
Paraxial Magnification        :                  0
Entrance Pupil Diameter       :                  5
Entrance Pupil Position       :                  0
Exit Pupil Diameter           :           25.35607
Exit Pupil Position           :           121.8849
Field Type                    : Paraxial Image height in Millimeters
Maximum Field                 :                  6
Primary Wave                  :          0.5875618
Lens Units                    :    Millimeters Wavelengths     : 3
Units: Microns
#       Value           Weight
1       0.486133        0.300000
2       0.587562        1.000000
3       0.656273        0.500000

Surf    Type            Radius          Thickness               Glass           Diameter
OBJ  STANDARD           Infinity        Infinity                                        0
STO  STANDARD           Infinity              25                                        5
  2  STANDARD           18.21773               8                S-LAH66               24
  3  STANDARD          -43.88633             1.5                   SF6               24
  4  STANDARD           39.32192               4                                      24
  5  BINARY_2           49.16756               3                ACRYLIC               21
  6  STANDARD          -36.51935               7                                      21
  7  STANDARD           Infinity        6.710901                                 13.8996
  8  STANDARD           Infinity             1.1                   BK7          11.82518
  9  STANDARD           Infinity               0                                11.76448
IMA  STANDARD          -41.51974                                                11.73085

Surface    5      : BINARY_2 (diffractive)
A (Coeff on r   4)  :  -6.4271956e-005
B (Coeff on r   6)  :  -4.9475274e-007
C (Coeff on r   8)  :   2.1320203e-009
D (Coeff on r  10)  :   0.0000000e-000
Maximum term     :              4
Maximum rad ap   :           10.5
A1 (Term on ρ to  2):    -749.63896
A2 (Term on ρ to  4):     477.78757
A3 (Term on ρ to  6):   -1001.5805
A4 (Term on ρ to  8):     948.66031
```

Fig. 11

HEAD MOUNTED DISPLAY VIEWING OPTICS WITH IMPROVED OPTICAL PERFORMANCE

SPECIFICATION

This application claims the benefit of U.S. Provisional Application No. 60/144,035, filed Jul. 16, 1999, which is incorporated herein by reference.

BACKGROUND OF THE INVENTION

1. Field of the Invention

The present invention is related to viewing optics, and in particular, a lightweight head mounted display (HMD) system combining aspheric and diffractive characteristics in a single element.

2. Description of the Related Art

In recent years, many head-mounted displays have been designed and produced for the virtual reality marketplace and other applications. Many of these systems are large in size, heavy, bulky, and exhibit poor optical performance. Imagery presented to the user can be fuzzy over all or some of the field of view. Annoying lateral color (i.e., color fringing) around objects and image distortion can occur.

Most prior art viewing optics design forms consist of from one to a plurality of lens elements used to magnify the object being viewed. These optical systems provide the user with a large apparent field of view with a comfortable and large eye relief clearance to the eye. These systems attempt to provide high image quality with minimal residual image degrading aberrations, such as astigmatism, coma, field curvature, lateral color, and distortion. The optical aperture stop of these systems is the iris of the human eye, and therefore is remote from the lens system itself. Some of the well-known methods of eliminating aberrations, such as design symmetry in many photographic camera lenses, thus cannot be used. For this reason, virtually all prior art viewing optics designs have severe image degrading aberrations.

Most prior art viewing optics designs are derived from eyepieces that were designed for telescope or microscope applications. These designs most often use glass lenses, and almost always have severe image degrading aberrations, especially in the outer periphery of the field of view. For example, prior art viewing optics such as those disclosed in U.S. Pat. Nos. 5,587,837, 5,557,463, 4,525,035, 4,482,217, 4,099,842, and 3,390,935, could exhibit significant residual off axis aberrations including, in particular, astigmatism, coma, lateral color, and distortion. While these patents are representatives of the prior art in viewing optics design, there are many similar prior art patents that also exhibit such limited optical performance.

Some of the design approaches use more optical elements to reduce image degrading aberrations. For example, U.S. Pat. No. 3,612,662 contains 10 lens elements. But, performance is degraded because of blurring at the outer periphery of the field of view. Using more optical elements also is disadvantageous because of the increased size, weight, and cost.

Other new design approaches use one or more plastic lens elements to reduce production costs and allow for non-spherical surfaces to reduce image-degrading aberrations. Using plastic elements that weigh less than glass also results in an overall weight reduction. While this approach is partially successful, lateral color and some other off-axis aberrations cannot be eliminated adequately.

Some of these new design approaches attempt to remedy such limitations. For example, U.S. Pat. No. 5,790,312 discloses a novel viewing optics design that is compact, light-weight, and of high performance. Special manufacturing methods, however, are required, and the design is not suitable for all applications. Further, due to inherent asymmetry in the design, the residual aberrations are asymmetrical with field position, which is disadvantageous.

Another design approach, as in U.S. Pat. No. 5,148,314, uses diffractive optics to supplement conventional refractive lenses. While such diffractive/refractive surface combinations permit correction of lateral color through dispersion compensation, and correction of other chromatic and monochromatic aberrations, most of these designs suffer from poor diffraction efficiency, which reduces contrast in resulting imagery.

All of the referenced prior art designs exhibit image degrading problems to varying degrees. And virtually all prior art designs are optimized on a flat imaging field. Very often a balance of aberrations, including astigmatism and coma, are used to maximize the optical performance. Unfortunately, this still often results in residual aberrations. Thus, there is a need for viewing optics with improved optical performance.

SUMMARY OF THE INVENTION

In general, in one aspect, embodiments of the invention feature an imaging optical system having a plurality of optical elements. The imaging optical system includes an aspheric kinoform diffractive element having an aspheric surface profile and a superimposed diffractive kinoform profile. The aspheric kinoform diffractive element is adapted to minimize residual optical aberrations and produce an optimized image on a curved image field of the imaging optical system.

Embodiments of the present invention offers advantages over prior art viewing optics in head mounted display systems and other applications requiring a close visually-viewed and magnified image of an object. These optical systems are often used as eyepieces, and their design forms evolved from the eyepieces used in telescopes, microscopes, and other visual optical systems.

Embodiments of the present invention feature a viewing optics design form that overcomes some or all of the deficiencies of prior art viewing optics designs by using the element having the diffractive surface superimposed on an otherwise nearly flat aspheric surface profile. This surface is positioned in the viewing optics where all ray angles incident on it are small and nearly the same over the whole field of view.

Allowing the design to be optimized on a slightly curved field or image surface provides a further advantage, resulting in improved optical performance over prior art designs having flat image fields. The curved field allows the elements in the system to control image blurring aberrations rather than having to also control field curvature as in prior art systems. The human eye can accommodate in its dioptric power for the curved field, and most users have no problem seeing the entire field in focus. Thus, the curved field does not reduce image quality, but instead allows image quality to be enhanced.

A technique often used in eyepieces to correct field curvature is to place a field flattening lens close to the image plane (or in an HMD, the imager plane). In an HMD application using a reflective imager, this is not possible due to space requirements for illumination injection. Thus, prior art designs that are optimized on a flat plane generally end up with residual field curvature partially balanced by astigmatism. Embodiments of the present invention feature the aspheric kinoform diffractive element to avoid or reduce this problem. A further advantage over the prior art is that the diffractive surface has a large kinoform pitch, which makes it significantly more manufacturable than prior art diffractive designs.

Embodiments of the imaging optical system further feature a cemented doublet and, in some embodiments, a flat or nearly flat faceplate that can be used, for example, with a display device such as a reflective liquid crystal display (LCD). The aspheric element can be made of, for example, acrylic. These embodiments reduce chromatic aberrations and minimize most of the monochromatic aberrations of the imaging optical system.

Embodiments of the present invention also feature use for image projection, in which case, instead of a user viewing an image through the imaging optical system, image light is projected for viewing onto a screen.

BRIEF DESCRIPTION OF THE DRAWINGS

A better understanding of the present invention can be obtained when the following detailed description of the invention is considered in conjunction with the following figures, in which:

FIG. 1 is a cross-sectional view of a prior art viewing optics design;

FIG. 2 is a lens design prescription for the prior art design of FIG. 1;

FIG. 11 is a lens design prescription for the viewing optics of FIG. 6; and

DETAILED DESCRIPTION

Figure 3:
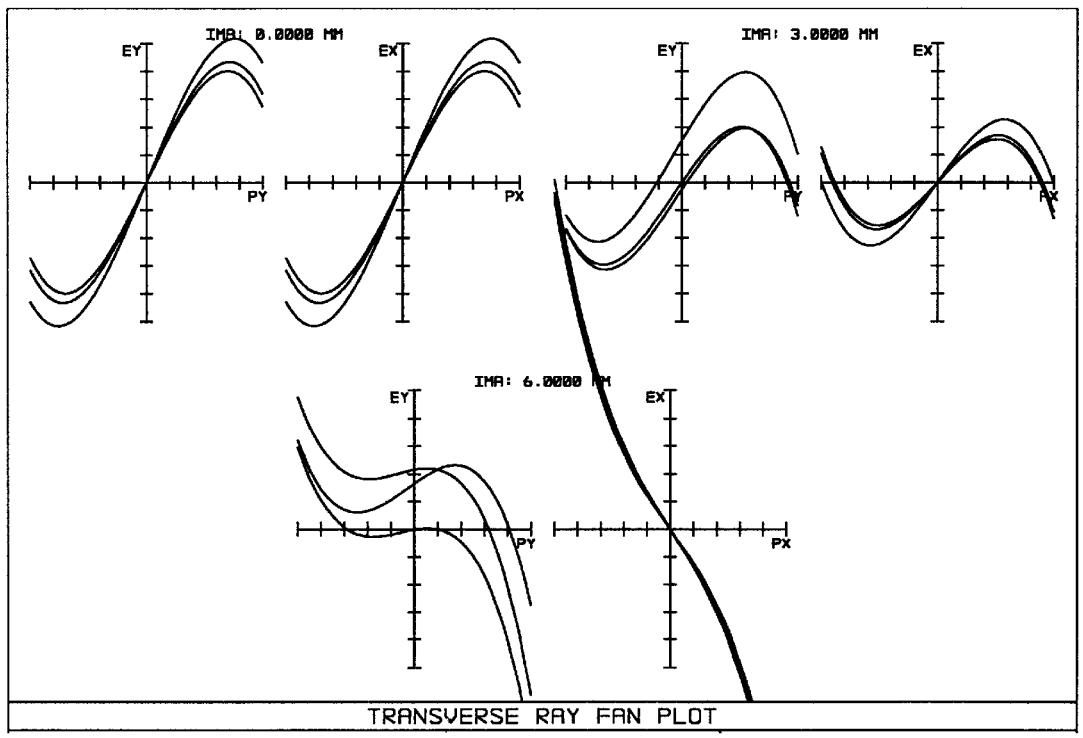
FIG. 3 is a plot of transverse ray aberrations for the prior art design of FIG. 1.

Eyepieces and magnifiers have been in use for many years in telescopes, microscopes, and many other applications where the user needs to magnify an object. These optical systems, which are often termed "viewing optics," consist of one or more lens elements distributed along the optical axis. This plurality of lens elements is used to allow the human eye to view the desired object closer than he or she can normally focus, and hence provides a magnified view of the object of interest.

A typical prior art viewing optics system design is shown in FIG. 1. In FIG. 1, a human eye 1 of a user is viewing an object 2 over a half-field of view or semi-field angle 3. The semi-field angle 3 allows the user to see a maximum extent 4 in the object 2 being viewed. This design form is known as a "Plössl" eyepiece, and provides a reasonable level of optical performance. The design consists of two cemented doublets, D1 and D2, with their positive elements in opposition. The first doublet D1 includes a high dispersion glass lens 5 and a low dispersion glass lens 6 (the positive element of doublet D1), and the second doublet D2 includes a low dispersion glass lens 7 (the positive element of doublet D2) and a high dispersion glass lens 8. The doublets D1 and D2, in some designs, are corrected independently for primary axial color, such that at the center of the field of view, red and blue light focus at or nearly at the same location.

The aperture stop of the system of FIG. 1 is effectively located at the iris of the eye 1. This means that off-axis imaging light is using only the outer periphery of the lenses D1 and D2. In many other forms of optical systems, including camera lenses, the aperture stop is located at a location somewhere near the center of the lens, for example, near the center of the system of FIG. 1. In these systems, the plurality of lens elements making up the design is distributed fore and aft of the stop, and it is very common that the lens elements on each side of the aperture stop are nearly symmetrical. It is well known in the art of lens design that such symmetry allows many off-axis aberrations to be minimized, in particular, coma, lateral color, and distortion.

For the reasons given above, viewing optics designs are often afflicted with the aberrations of astigmatism, coma, distortion, and lateral color. While some design forms may attempt to minimize some or all of these aberrations, they are present in virtually all prior art design forms.

FIG. 2 is a listing of the lens design data or prescription of the typical prior art design form shown in FIG. 1. One of ordinary skill in the art of lens design will appreciate these lens design data and prescription, which can be developed using any well-known lens design software, such as ZEMAX® by Focus Software, Inc. The data shown in the upper portion of the listing summarize the general lens data and specifications, and the lower portion of the listing is the design prescription. The constructional data in the prescription include radius, thickness, and glass columns that define the data for the lens in FIG. 1. These data, used in conjunction with the general system data shown in the upper part of the listing, allow one of ordinary skill in the art to model the design on any of the standard lens design computer programs and determine lens performance characteristics. Further, these data allow one to produce the design in hardware.

FIG. 3 is a plot of the transverse ray aberrations of the Plössl design of FIG. 1. One of ordinary skill in the art will appreciate that these data show the residual lens aberrations at three fields of view: the center of the field, halfway to the edge of the field, and at the edge of the field. The data are plotted on a scale of ±10 microns for a design viewing a 12 mm diameter object, such as the object 2 in FIG. 1. It is clear from FIG. 3 that the off-axis aberrations are in the order of 50 microns of image blur. The aberrations present at the edge of the field include astigmatism, field curvature, coma, and lateral color, as will be appreciated by those skilled in the art. A computer analysis shows that this design has a residual distortion of 4.3%.

Figure 4:
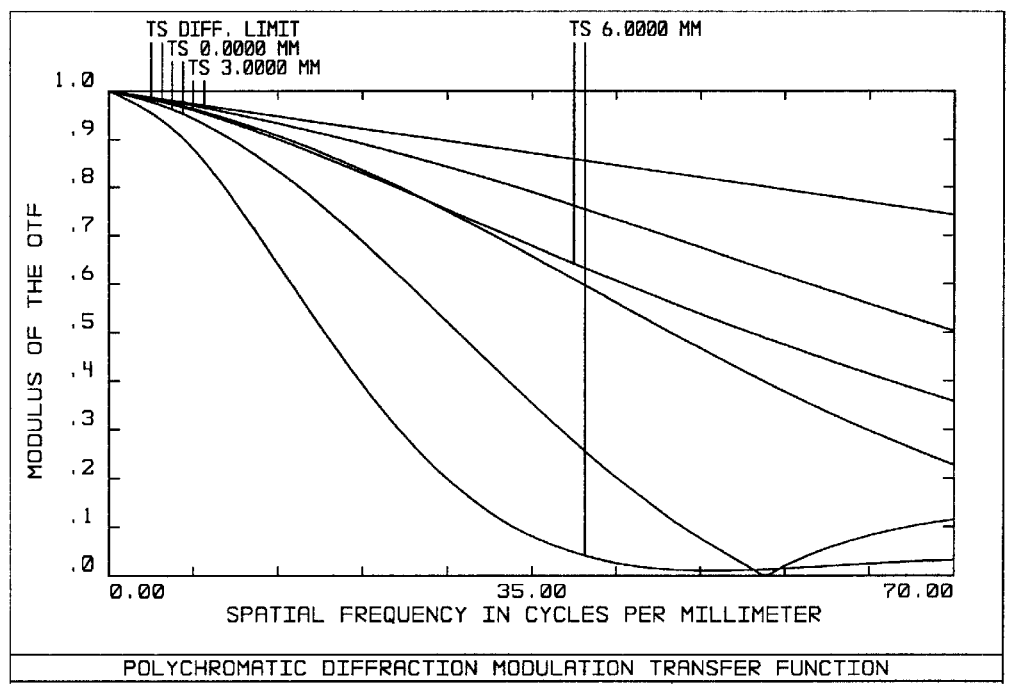
FIG. 4 is a plot of the Modulation Transfer Function (MTF) for the prior art design of FIG. 1.

FIG. 4 is a plot of the Modulation Transfer Function (MTF) of the prior art Plössl design of FIG. 1. The MTF data for a lens are generally accepted to be the most comprehensive and useful means for describing its optical performance, as will be appreciated by one of ordinary skill in the art. These data show, in effect, the contrast of the image as a function of the number of line pairs (lp) per millimeter (mm) in the image. As the lines in an object pattern get closer and closer together, the image contrast decreases due to the design itself, diffraction, manufacturing errors, and other factors. The spatial frequency in line pairs per mm (lp/mm) corresponding to one per minute of arc that matches the resolution of the human eye is approximately 70 lp/mm at the image, and these data are plotted in FIG. 4 to this eye-limiting spatial frequency. It is clear from the plots that the optical performance is severely degraded with almost zero contrast at off-axis field positions. Even for 2 arc minute lines, the contrast is nearly equal to zero at the edge of the field.

Figure 5:
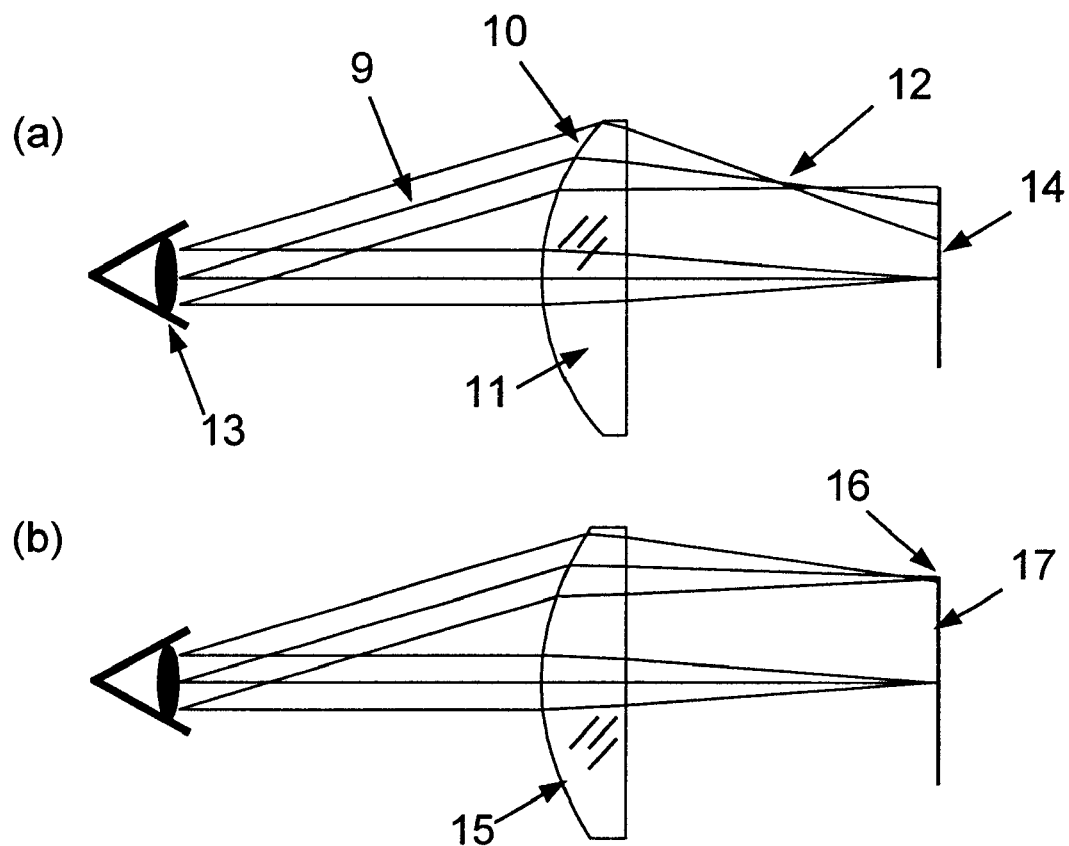
FIGS. 5(a) and 5(b) are cross-sectional views that schematically demonstrate a prior art technique of using an aspherical surface to correct astigmatism.

The lens of FIG. 1 also suffers from residual astigmatism, which is demonstrated schematically in FIG. 5(a). In a viewing optics configuration, FIG. 5(a) shows how obliquely incident light 9 that impinges on a spherically curved surface 10 of a lens 11 pulls an off-axis image 12 inward (where the light rays cross), as viewed by an eye 13. In other words, in the view shown in FIG. 5(a), the off-axis image 12 is actually located in the plane of FIG. 5(a) to the left of a desired image surface 14 because of astigmatism. One common prior art method for eliminating such residual astigmatism is to use an aspheric, or non-spherical, surface on one of the lens elements. FIG. 5(b) shows an aspheric surface 15 designed to avoid this problem. It is clear that the off-axis image position in the plane of FIG. 5(b) is moved to the right to position 16 on a desired image surface 17. This technique virtually eliminates the astigmatism that would occur with the spherically surfaced lens 11. The design form in FIG. 1, however, still has significant coma, distortion, and lateral color and field curvature. The coma and lateral color each amount to approximately 100 microns for a lens meeting the basic specifications of the lens shown in FIG. 1, and the distortion is over 6%. This lens would perform poorly in most applications where high image quality is required.

The present invention overcomes or at least reduces the image degrading aberrations present in all prior art viewing optics designs by combining the techniques described above, including that for the elimination or reduction of astigmatism. Further, the present invention uses a diffractive surface superimposed on an aspheric surface profile in which the angles of incidence on the diffractive surface are nearly the same over the entire field of view (field of view is the angular extent of what the user's eye sees). Use of the diffractive surface eliminates or nearly eliminates lateral color. Axial color also is eliminated or nearly eliminated.

Figure 6:
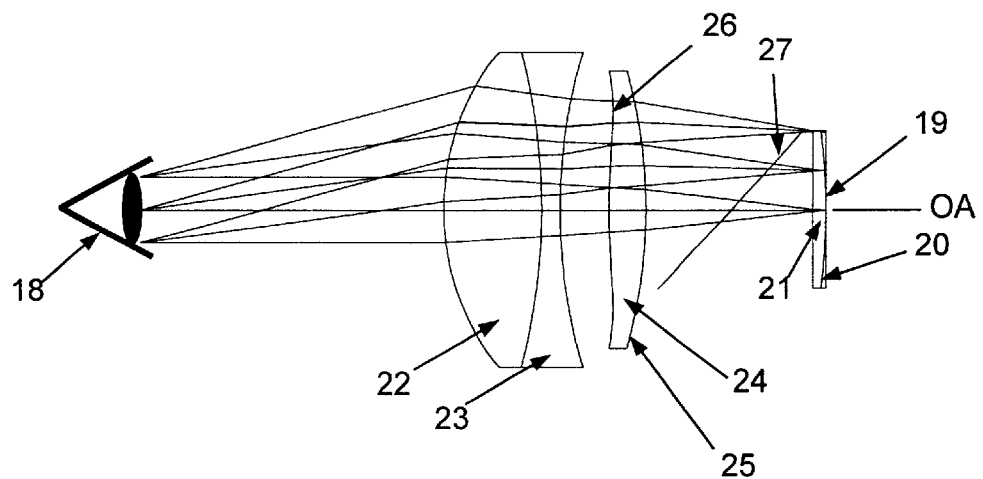
FIG. 6 is a cross-sectional view of viewing optics, in accordance with an embodiment of the invention.

FIG. 6 is a cross-sectional view of viewing optics aligned along a common optic axis (OA), in accordance with an embodiment of the invention. When in use, as described below, all of the optical elements aligned along the OA in FIG. 6 are in light propagation communication, meaning that rays of light are propagated between them. A human eye 18 is viewing an object at location 19. The design is optimized intentionally onto a curved field 20. A flat or nearly flat glass faceplate 21 is located adjacent to the object being viewed as is typical when using display devices, such as LCDs. In other embodiments, the flat glass faceplate 21 is not used. The disclosed embodiment consists of a cemented doublet that includes a positive low dispersion "crown" glass lens element 22 cemented to a high dispersion "flint" lens element 23. In the disclosed embodiment, for example, the V-number or Abbe number, which describes the dispersion, is approximately 50 for the crown glass element and approximately 25 for the flint glass element. Glass of other dispersion values could also be used.

The viewing optics in FIG. 6 also includes a single lens element 24 whose rear surface 25 is spherical and front surface 26 is aspherical. The front surface 26 in addition to being aspheric is also diffractive in the form of a kinoform profile. A kinoform is a diffractive surface, which can be thought of as having a profile similar to a saw tooth where the height of each tooth is approximately 2 wavelengths of light or approximately 1 micron. It will be appreciated by those skilled in the art of lens design that other embodiments are possible that contain these teachings. These other embodiments are included within the scope and spirit of the present invention. The lens element 24 in FIG. 6 can be manufactured of a polymer material, such as acrylic. The basic optical properties of this polymer material are similar to ordinary optical glass BK7. The lens element 24 can also be manufactured of alternate materials, such as polystyrene, cyclic olefin copolymer (COC), amorphous polyolefin (e.g., ZEONEX™ by Nippon Zeon Co, Ltd.), or the like, for example. Such polymer materials allow the lens element 24 to be injection molded for cost effective manufacturing.

Also shown in FIG. 6 is a tilted surface 27, in accordance with an embodiment of the invention. This tilted surface indicates where a beamsplitter could be located to inject light from a light source (not shown) when the lens system shown in FIG. 6 is used with a reflective imaging device, such as a reflective LCD, in an HMD application. In this embodiment, the light source would provide light in an upward direction for the orientation of the viewing optics shown on the page of FIG. 6 to be reflected at the tilted surface 27 location to, for example, a reflective LCD object at the location 19. An image would thus be reflected (with appropriate polarization) through the viewing optics to the eye 18, as will be appreciated by those skilled in the art. While the invention is not limited to HMD applications, this is one use of the present invention.

Figure 7:
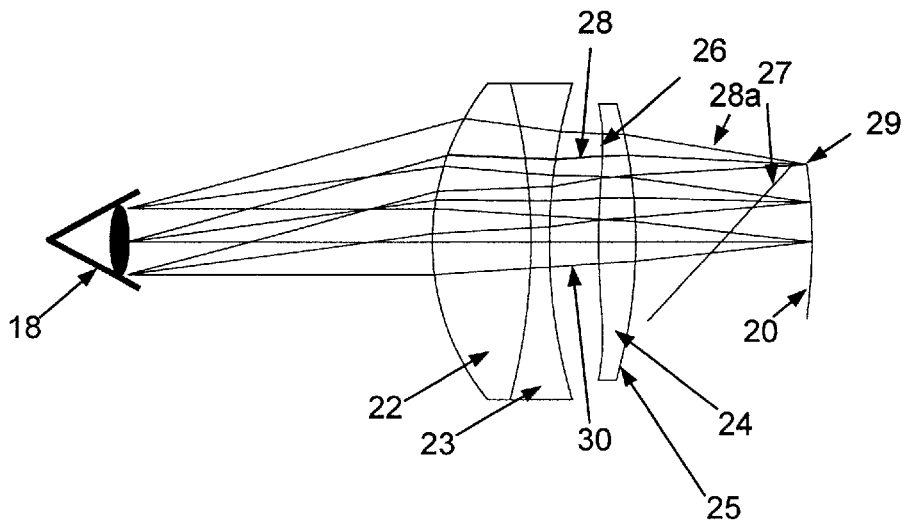
FIG. 7 is another cross-sectional view of the viewing optics of FIG. 6.
Figure 8:
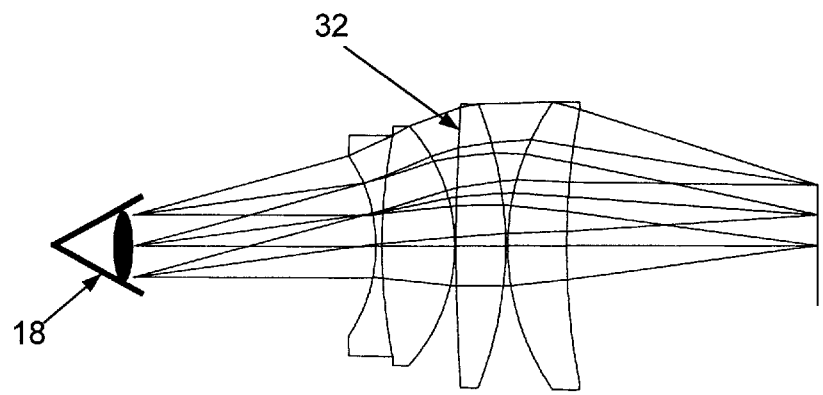
FIG. 8 is a cross-sectional view of a prior art viewing optics design.

In optimizing design and image quality, it is desirable for the angles of incidence onto the aspheric kinoform diffractive surface 26 to be small. The design of the disclosed embodiment ensures that this will be true because during the design optimization of the disclosed embodiment, the aspheric profile was controlled so that the average slope of the surface 26 is approximately zero relative to a normal to the OA. Other embodiments use different methods to ensure these angles of incidence are small, for example, by constraining in the design optimization, as will be appreciated by those of ordinary skill in the art of lens design. These other embodiments are included within the scope and spirit of the present invention. The reason to minimize these angles of incidence is to maximize the diffraction efficiency of the surface 26 and minimize scattering effects. FIG. 7 is another cross-sectional view of the disclosed embodiment of FIG. 6 (without the flat faceplate 21 for clarity) useful for demonstrating these angles. In FIG. 7, the central (or chief) rays of any cone of rays, such as ray 28 of the cone of rays 28a, leading to any given curved image position 29 on the curved field 20, are preferably limited by design to have an angle of incidence of less than approximately 5 degrees (i.e., less than approximately ±5 degrees), although it could be higher, onto the aspheric kinoform diffractive surface 26. This angle of incidence is relative to an effective normal to the aspheric kinoform diffractive surface 26 defined by the aspherical profile of that surface alone, ignoring the sawtooth-like variation of the kinoform, as will be appreciated by those skilled in the art of lens design. The half-cone angle of the light cone 28a imaging at image position 29 preferably is also approximately 5 degrees (although it could be higher) relative to the normal to the curved field 20 in the disclosed embodiment. Thus, the maximum angle of incidence of any ray onto the aspheric kinoform diffractive surface 26 preferably is less than approximately 10 degrees (i.e., less than approximately ±10 degrees), although it could be as much as less than approximately 15 degrees (i.e., less than approximately ±15 degrees), as will be appreciated by those skilled in the art. In most prior art design forms, much larger angles of incidence are present onto diffractive surfaces. For example, in FIG. 8, a prior art viewing optics design is shown in which a diffractive surface has been incorporated onto a surface 30 of a lens having no aspherical surfaces. The maximum angle of incidence is approximately 25 degrees. This results in potentially significant surface scattering and diffraction inefficiencies. The present invention advantageously reduces or overcomes such problems.

In the disclosed embodiment, the optical power of the lens element 24 should be relatively low. The power of this element is, for example, approximately 0.025 mm$^{-1}$ in the disclosed embodiment, although other powers are possible. This is advantageous if the lens element 24 is to be made of acrylic or some other polymer. Polymers typically have a significant change in their refractive index as a function of temperature. Acrylic has a dn/dt (refractive index change per degree C.) of $-85 \times 10^{-6}$ as compared to ordinary BK7 optical glass, which is approximately $+3 \times 10^{-6}$. Making the power of the element 24 low minimizes any focus shift that can occur with temperature. For the disclosed embodiment, a temperature change from 21 degrees C. (ambient) to 38 degrees C. (100 degrees F.) results in a focus shift of only approximately 15 microns, which is negligible.

In the disclosed embodiment, the viewing optics that includes the lens elements 22, 23, and 24 in FIG. 6 produces an optimized image on the curved image field 20, as shown in FIG. 7. The curved image field 20 represents an imaginary surface (in space or within an optical element such as the flat faceplate 21, for example) for which image quality is optimized and upon which the eye focuses. In the disclosed embodiment, the curved image field 20 has a radius of curvature of approximately 41.51974 mm (see FIG. 11 for lens prescription data), although, in other embodiments, other radii of curvature are possible, as will be appreciated by those skilled in the art of lens design. In almost all prior art optical systems the image quality is optimized onto a flat image surface. This is true for camera lenses as well as almost all other lens design forms. In some situations the real image surface is intentionally curved, for example, in night vision goggle faceplates and dome projection systems. When a lens is optimized for a flat image, the inherent field curvature of the lens must be eliminated as much as possible. One method for accomplishing this to some extent is to introduce astigmatism off-axis. While this may result in the optimum solution for a flat image surface, the residual astigmatism degrades the overall imaging performance. The present invention uses the aspheric kinoform diffractive surface 26 to eliminate most of the astigmatism, and because the image is allowed to curve, this helps to eliminate nearly all of the astigmatism.

It is known that the human eye for most people can accommodate or change its focus. This means that for a residual curved field, most people will be able to refocus their eyes to see the image clearly over the entire field of view. The field of view in the disclosed embodiment is approximately 28 degrees full diagonal, although different fields of view are possible in other embodiments. In the disclosed embodiment, there is a non-limiting field curvature of approximately 0.75 diopters. Embodiments of the present invention are preferably designed to be within this non-limiting field curvature for the curved image field 20 over the whole field of view, which is approximately at the limit of the ability for the human eye to accommodate. In other embodiments, this limitation is relaxed, however, to a certain extent, depending on the design and application. Thus, for example, if a user focuses the viewing optics of FIG. 6 that includes the lens elements 22, 23, and 24 so that the corner of the display appears at infinity, the user will need to refocus his or her eyes to a distance of approximately 1.3 meters to focus clearly on the center of the field of view. This can be determined by evaluating a computer model of the disclosed embodiment. Most people will not find this to be a problem. The prior art example of FIG. 1 has nearly zero field curvature, however, but this is achieved at the expense of introducing other aberrations, which cause an overall poor level of optical performance (see FIGS. 3 and 4).

Figure 9:
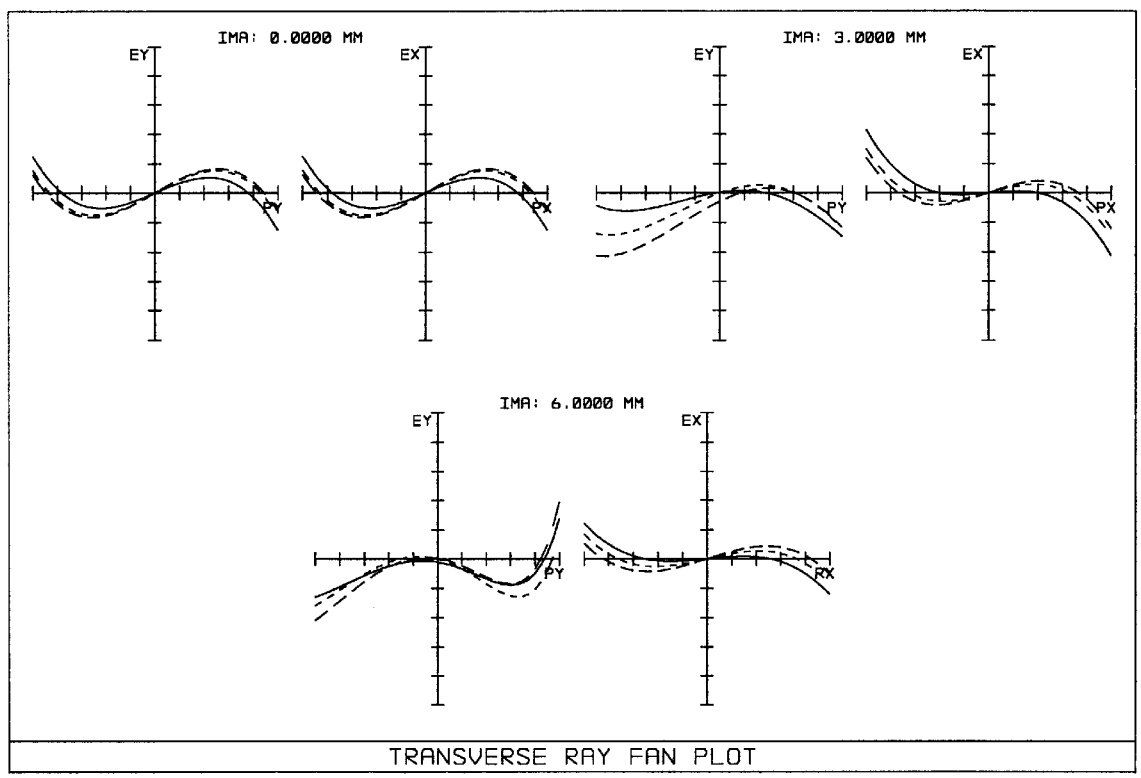
FIG. 9 is a plot of transverse ray aberrations of the viewing optics of FIG. 6.

The aspheric kinoform diffractive surface 26 also allows for the correction of the lateral color off-axis. By combining the even order terms of the kinoform pitch variation with an aspheric surface contour on surface 26 (discussed below and in reference to FIG. 11), the residual aberrations of astigmatism, distortion, and lateral color advantageously can be optimized and balanced. This is achieved by allowing the coefficients describing the separation of adjacent kinoform grooves or saw teeth to change their spacing, in a radial direction from the center of the lens outward, quadratically as well as to the fourth power of the radial distance. Allowing for the curved field, as discussed above, helps this optimization and balancing. The result is a significantly improved level of optical performance, as demonstrated by FIGS. 9 and 10. FIG. 9 shows the transverse ray aberrations on a comparative scale to FIG. 3. These data are also plotted on a scale of ±10 microns. It is clear from FIG. 9 that the performance is significantly improved over the prior art design. This improvement is demonstrated by comparing the performance of the prior art design to the performance of the disclosed embodiment. The prior art design has image root mean square (rms) blur diameters at the image ranging from approximately 12 microns to approximately 35 microns over its field of view. This is to be compared to a range of approximately 2 microns to approximately 4 microns for the disclosed embodiment over its field of view. This is an approximately 90% reduction in image blurring. The lateral color is improved by more than approximately 95% for the disclosed embodiment. And distortion is improved by a factor of approximately 3.

Figure 10:
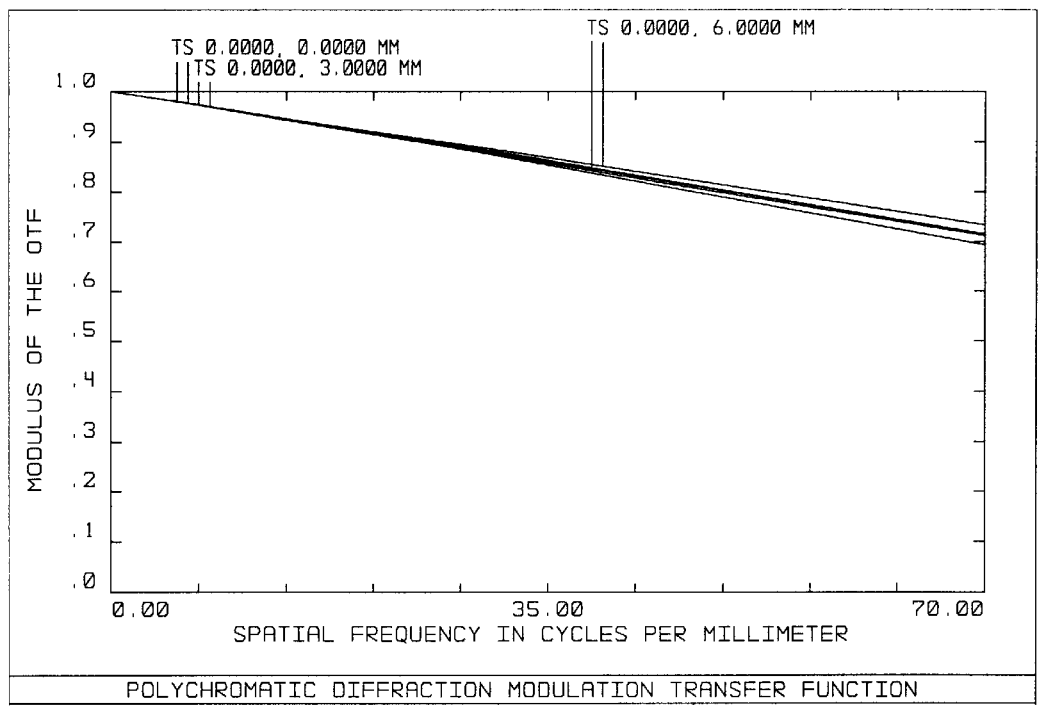
FIG. 10 is a plot of the MTF of the viewing optics of FIG. 6.

Another improvement of this invention over the prior art is that the kinoform period (the separation between the kinoform grooves or saw teeth) can be made relatively large. In the disclosed embodiment, the kinoform period is approximately 90 microns, which makes the design easy to manufacture using either single point diamond turning or injection molding. Other kinoform periods are possible in the present invention FIG. 10 is a plot of the MTF, which was described earlier, for the disclosed embodiment design. At the resolution corresponding to the human eye resolution capability, the contrast is approximately 70%, and represents a significant improvement over the prior art design, which was essentially zero percent contrast at the edge of the field of view.

FIG. 11 shows a listing of the data and design prescription of the disclosed embodiment, as will be appreciated by those skilled in the art of lens design. These data are in similar format to that of FIG. 2 for the prior art design example of FIG. 1, and were developed using the ZEMAX® lens design software by Focus Software, Inc. Referring to the lower portion of the data shown in FIG. 11, one of ordinary skill in the art of lens design will appreciate the meanings of the terms prescribing Surface 5, which is the aspheric diffractive kinoform surface 26 of FIGS. 6, 7, and 12. The surface 26 of lens element 24 in the disclosed embodiment can be manufactured of acrylic material, as discussed, and can be defined according to the following prescription for a kinoform diffractive profile superimposed on an even polynomial aspheric surface:

The even polynomial asphere is defined by:

$$Z = \frac{r^2/R}{1+\sqrt{1-(k+1)r^2/R^2}} + Ar^4 + Br^6 + Cr^8 + Dr^{10}$$

where Z is the sagitta (or sag) of the surface 26. The first term in the equation for Z describes a standard conic section, and if k=0, the term describes a sphere. The other terms are even polynomial terms that describe the aspheric deviation from the conic section. R is the radius of a sphere. r is the radial coordinate. For illustration of the disclosed embodiment, k=0 (for a sphere) and R=49.16756 mm (base radius of curvature). As indicated in FIG. 11, the coefficients of the radial coordinate r for the four even aspheric terms are:

A=−6.4271956×10$^{-5}$
B=−4.9475274×10$^{-7}$
C=2.1320203×10$^{-9}$
D=0.0000000

The superimposed diffractive kinoform adds phase Φ to a light ray according to the expression:

$$\Phi = \sum_{i=1}^{N} A_i \rho^{2i}$$

where N is the maximum number of even polynomial terms (4 in this case), ρ is the normalized radial aperture coordinate, and $A_i$ is the coefficient on the $2i^{th}$ power of ρ. So, for the maximum of N=4 and a maximum radius aperture (Maximum radial aperture in FIG. 11)=10.5 mm, this illustration of the disclosed embodiment yields the following coefficients for the phase Φ:

A1 (Term on $\rho^2$)=−749.63896
A2 (Term on $\rho^4$)=477.78757
A3 (Term on $\rho^6$)=−1001.5805
A4 (Term on $\rho^8$)=948.66031

The above prescription is merely illustrative and those skilled in the art will recognize that other such prescription embodiments can be envisioned for the viewing optics according to the present invention. These other prescription embodiments are included within the scope and spirit of the present invention.

Figure 12:
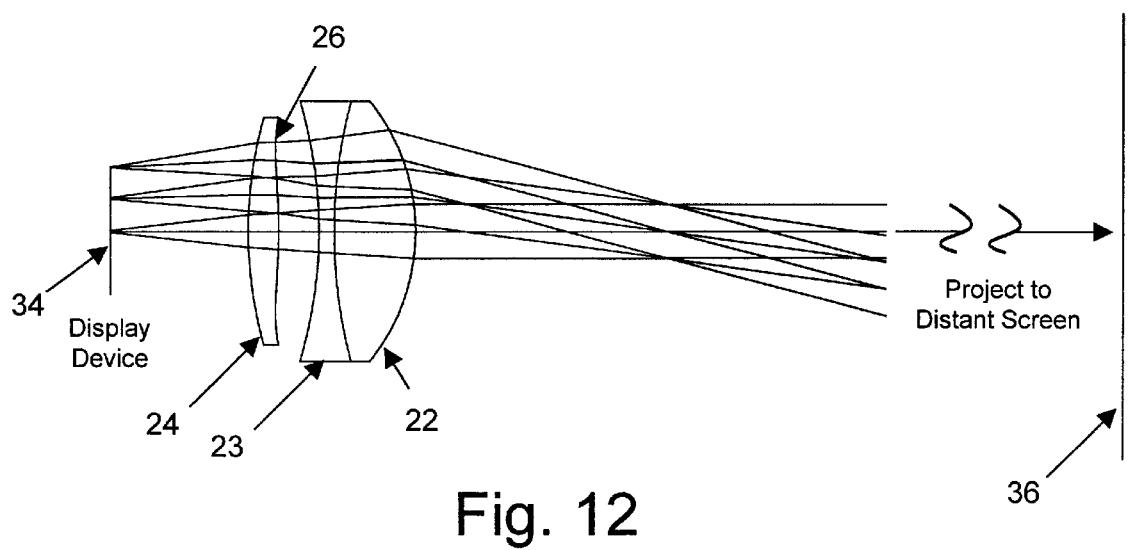
FIG. 12 is a cross-sectional view of viewing optics used for image projection, in accordance with an embodiment of the invention.

FIG. 12 shows viewing optics similar to FIGS. 6 or 7, which can be used for image projection, in accordance with an embodiment of the invention. A faceplate like the faceplate 21 of FIG. 6 can be included in certain embodiments, as described above, depending on the design and application, as will be appreciated by those of skill in the art. In FIG. 12, a display device or image source 34 provides an image for projection. The display device 34 could be a light transmissive device such as a transmissive LCD or a reflective device such as a reflective LCD. The display device 34 could include a light source (not shown), although a separate light source is possible in other embodiments. For a reflective device, a tilted surface like the tilted surface 27 of FIGS. 6 and 7 could be used for illumination injection and subsequent image transmission from the display device 34 upon appropriate polarization changes for imaging. The transmitted image is projected using the viewing optics of FIG. 12 to a screen 36 for viewing.

The foregoing disclosure and description of the various embodiments are illustrative and explanatory thereof, and various changes in lens components, lens elements, refractive and diffractive characteristics, as well as other details of the illustrated systems, may be made without departing from the spirit and scope of the present invention. It shall be understood that viewing optics according to the described techniques can be implemented in a variety of systems.

We claim:

1. An imaging optical system having a plurality of optical elements, comprising:
    an aspheric kinoform diffractive element comprising:
        an aspheric surface profile, and
        a diffractive kinoform superimposed on the aspheric surface profile, the aspheric kinoform diffractive element adapted to minimize residual optical aberrations and produce an optimized image on a curved image field of the imaging optical system.

2. The imaging optical system of claim 1, wherein the aspheric kinoform diffractive element is adapted to receive incident light rays at angles within approximately ±15 degrees of normal to the aspheric surface profile over an entire field of view of the imaging optical system.

3. The imaging optical system of claim 2, wherein the aspheric kinoform diffractive element is adapted to receive incident light rays at angles preferably within approximately ±10 degrees of normal to the aspheric surface profile over the entire field of view.

4. The imaging optical system of claim 1, wherein the imaging optical system comprises a magnifier or eyepiece.

5. The imaging optical system of claim 4, wherein the magnifier or eyepiece provides a visual view of a display device or other object.

6. The imaging optical system of claim 1, wherein image quality is optimized onto the curved image field.

7. The imaging optical system of claim 1, further comprising a centered doublet adapted to be in light propagation communication with a single aspheric kinoform diffractive element.

8. The imaging optical system of claim 7, wherein the centered doublet and the single aspheric kinoform diffractive element are adapted to propagate image light to a user for viewing when the imaging optical system is used for viewing, and to a screen when the imaging optical system is used for projecting.

9. The imaging optical system of claim 1, wherein the single aspheric kinoform diffractive element comprises polymer material.

10. The imaging optical system of claim 9, wherein the polymer material comprises acrylic.

11. The imaging optical system of claim 1, further comprising a centered doublet adapted to be in light propagation communication with the aspheric kinoform diffractive element, wherein the aspheric kinoform diffractive element and the centered doublet are adapted to produce a field curvature over a whole field of view of the imaging optical system of no more than the approximate limit of the ability for the human eye to accommodate.

12. An imaging optical system, comprising:
a plurality of optical elements comprising:
an element having an aspherical surface profile and a diffractive kinoform adapted to minimize residual optical aberrations of the imaging optical system, the plurality of optical elements adapted to limit incidence angles of light incident onto the element having the aspherical surface profile and the diffractive kinoform to approximately ±15 degrees maximum over an entire field of view of the imaging optical system.

13. The imaging optical system of claim 12, wherein the imaging optical system is optimized for imaging onto a curved field, and light rays incident onto the curved field are limited to approximately ±5 degrees maximum over the entire field of view.

14. The imaging optical system of claim 12, wherein a projection system comprises the imaging optical system.

15. The imaging optical system of claim 12, further comprising a nearly flat faceplate adapted to be in light propagation communication with the element.

16. The imaging optical system of claim 12, wherein the plurality of optical elements are adapted to produce a field curvature over a whole field of view of the imaging optical system of no more than the approximate limit of the ability for the human eye to accommodate.

17. The imaging optical system of claim 12, wherein the plurality of optical elements are adapted to limit incidence angles of light incident onto the element having the aspherical surface profile and the diffractive kinoform preferably to approximately ±10 degrees maximum over the entire field of view.

18. A method of implementing an imaging optical system, the method comprising:

forming an aspherical profile on one of a plurality of lens elements;

superimposing a kinoform diffractive profile onto the aspherical profile;

aligning the plurality of lens elements along an optic axis; and optimizing image quality of the plurality of lens elements over a curved field of the imaging optical system.

19. The method of claim 18, wherein the optimizing comprises producing a field curvature over a whole field of view of the imaging optical system of no more than the approximate limit of the ability for the human eye to accommodate.

20. The method of claim 18, wherein the optimizing comprises limiting incidence angles of light incident onto the one of the plurality of elements to approximately ±15 degrees maximum over an entire field of view of the imaging optical system.

21. The method of claim 20, wherein the optimizing comprises limiting incidence angles of light incident onto the one of the plurality of elements preferably to approximately ±10 degrees maximum over the entire field of view.

* * * * *